(12) United States Patent
Harrison (10) Patent No.: US 9,314,919 B2
(45) Date of Patent: Apr. 19, 2016

(54) TRUCK BOX WITH REINFORCED LID

(71) Applicant: Craig Harrison, Gulf Breeze, FL (US)

(72) Inventor: Craig Harrison, Gulf Breeze, FL (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 37 days.

(21) Appl. No.: 14/275,190

(22) Filed: May 12, 2014

(65) Prior Publication Data

US 2015/0321336 A1 Nov. 12, 2015

(51) Int. Cl.
| | | |
|---|---|---|
| *B60R 9/00* | (2006.01) | |
| *B65D 43/16* | (2006.01) | |
| *B25H 5/00* | (2006.01) | |
| *B25H 3/02* | (2006.01) | |
| *B65D 51/24* | (2006.01) | |
| *B65D 6/10* | (2006.01) | |
| *B60R 9/06* | (2006.01) | |

(52) U.S. Cl.
CPC .. *B25H 5/00* (2013.01); *B25H 3/02* (2013.01); *B65D 43/16* (2013.01); *B65D 51/24* (2013.01); *B60R 9/065* (2013.01); *B65D 7/22* (2013.01)

(58) Field of Classification Search
CPC ............ B60R 9/00; B60R 9/065; B65D 7/22; B65D 43/00; B65D 43/16; B65D 43/166
USPC .......................................... 224/404; 296/37.6
See application file for complete search history.

(56) References Cited

U.S. PATENT DOCUMENTS

| | | | | |
|---|---|---|---|---|
| 3,640,423 A | * | 2/1972 | Parker et al. .................. | 220/324 |
| 3,940,009 A | * | 2/1976 | Szeles ........................... | 220/564 |
| 4,674,782 A | * | 6/1987 | Helber .......................... | 293/106 |
| 4,967,944 A | * | 11/1990 | Waters ......................... | 224/404 |
| 5,067,766 A | * | 11/1991 | Lovaas ..................... | 296/100.04 |
| 5,201,561 A | * | 4/1993 | Brown ......................... | 296/37.5 |
| 5,484,092 A | | 1/1996 | Cheney | |
| 5,743,586 A | | 4/1998 | Nett | |
| 5,875,948 A | * | 3/1999 | Sadler .......................... | 224/404 |
| 5,938,264 A | * | 8/1999 | Yates ........................... | 296/37.6 |
| 6,340,194 B1 | * | 1/2002 | Muirhead et al. ........ | 296/100.06 |
| 6,431,633 B1 | | 8/2002 | Young et al. | |
| 6,561,560 B2 | * | 5/2003 | Brown et al. ............... | 296/26.11 |
| 6,641,013 B2 | * | 11/2003 | Dise ............................. | 224/404 |
| 6,830,167 B2 | | 12/2004 | Schomaker | |
| 6,857,683 B2 | * | 2/2005 | Myers ..................... | 296/100.02 |
| 6,889,417 B2 | | 5/2005 | Jones et al. | |
| 7,168,590 B2 | | 1/2007 | Jones et al. | |
| 7,318,618 B1 | * | 1/2008 | Yue .......................... | 296/100.06 |
| RE42,964 E | | 11/2011 | Jones et al. | |
| 8,231,164 B2 | * | 7/2012 | Schubring et al. ......... | 296/37.14 |
| 2001/0032848 A1 | | 10/2001 | Jones et al. | |
| 2005/0029275 A1 | * | 2/2005 | Baughman ................... | 220/845 |
| 2007/0046056 A1 | * | 3/2007 | Delaney et al. ............. | 296/37.6 |
| 2007/0194185 A1 | * | 8/2007 | Carothers et al. ........... | 248/200 |
| 2009/0200351 A1 | * | 8/2009 | Brallier et al. .............. | 224/404 |
| 2011/0010923 A1 | | 1/2011 | Guarino et al. | |

* cited by examiner

*Primary Examiner* — Justin Larson
(74) *Attorney, Agent, or Firm* — GrayRobinson, PA; Thomas L. Kautz (57) ABSTRACT

A truck box is provided having a reinforced lid which resists bending, crimping, torqueing and misalignment when being opened and closed, and which avoids the appearance or a wave or roll along the surface of the lid.

8 Claims, 7 Drawing Sheets

TRUCK BOX WITH REINFORCED LID

FIELD OF THE INVENTION

This invention relates to storage boxes for use with vehicles, and, more particularly, to a truck box having a reinforced lid which resists bending, crimping, torqueing and misalignment when being opened and closed, and which avoids the appearance or a wave or roll along the lid when closed.

BACKGROUND OF THE INVENTION

One of the most popular accessories for trucks and recreational vehicles is a truck box used to store and secure a variety of tools and other items. There are a number of different types of truck boxes, including cross-over boxes, side mount boxes, chest boxes, top mount boxes, RV boxes and others. Truck boxes of this type are typically formed of aluminum tread plate, and comprise a front wall, a back wall, a bottom wall and opposed end walls which are interconnected to form a hollow interior. The truck box interior is closed by a top wall or lid pivotal between open and closed positions on a hinge mounted to the back wall, usually with the assistance of gas springs.

Many of the truck boxes noted above have a lid with a substantial length or longitudinal dimension as measured between the end walls of the box compared to its width, e.g. the distance between the front and back walls. Cross-over boxes, for example, span the entire width of a truck bed from one side wall to the opposite side wall. Users wishing to access the interior of the cross-over box typically stand to one side of the truck bed, along one of the vehicle side walls, and grasp the lid near one end to open or close it. Repetitive motions of opening and closing the lid, particularly when it is grasped from one side or the other, have a tendency to twist, torque and/or bend the lid which can lead to misalignment with the remainder of the truck box when the lid is closed.

One approach to addressing this problem which is found in the prior art involves providing a cavity in the truck box lid which is formed between a top sheet and a liner sheet connected to one another by welding or similar means. An expansible, self-curing foam is injected into the cavity, which, when cured, fills the entirety of the cavity and adheres to both the top sheet and the liner sheet. See, for example, U.S. Pat. Nos. 7,168,590; RE42,964; and 6,830,167. Tonneau covers for the beds of trucks have also employed this construction, either using expansible, self-curing foam injected into a cavity of the cover, or, previously cured foam which is cut from a sheet and adhered in place. See, for example, U.S. Pat. Nos. 6,431,633 and 5,743,586.

It has been found that the use of an expansible, self-curing foam to fill a cavity formed between two panels of truck box lids or tonneau covers can result in the appearance of a "roll" or "wave" in the lid or cover. The aluminum tread plate from which truck box lids are formed is relatively thin and subject to deflection when the foam cures. The result is one or more raised areas, especially toward the middle of the truck box lid, where the foam has expanded to such an extent that the exposed top sheet of the lid deflects outwardly forming a roll or wave that detracts from the overall appearance of the truck box.

SUMMARY OF THE INVENTION

This invention is directed to a truck box having a reinforced lid which resists bending, crimping, torqueing and misalignment when being opened and closed, and which avoids the appearance or a wave or roll along the lid.

In one presently preferred embodiment, the lid of this invention includes a lid cover and a one-piece lid insert having first and second panels that are joined by a single longitudinally extending generally C-shaped channel which projects inwardly from such panels. The lid cover and lid insert may be connected to one another by welding or gluing the peripheral edge of the lid insert to downwardly depending members of the lid cover, and by welding or gluing the base of the channel of the lid insert to a top wall of the lid cover. Two separate cavities are formed between the first and second panels of the lid insert and the lid cover, one on either side of the channel. Optionally, one or more shots of an expansible, self-curing foam may be injected into each cavity to form discrete "pancakes" or generally circular areas of foam which, when cured, adhere to both the lid insert and the top wall of the lid cover.

In an alternative embodiment of this invention, the lid includes a one-piece lid insert having a generally corrugated construction in which a number of spaced panels are separated by and connected to generally C-shaped channels. Each channel projects inwardly from adjacent panels of the lid insert such that when the lid insert and lid cover are assembled the base of each channel contacts a top wall of the lid cover. The lid insert and lid cover may be connected by welding or gluing, and, optionally, an expansible, self-curing foam may be injected into one or more cavities formed between each panel, a top member of the lid cover and adjacent channels.

A still further embodiment of the lid herein comprises a lid cover and a one-piece lid insert formed with first and second panels that are joined by a single longitudinally extending recessed area which projects outwardly from such panels. Each panel, in turn, is formed with a series of side-by-side, longitudinally extending cross braces each having an inner surface which contacts a top wall of the lid cover. A cavity is formed between the recessed area of the lid insert and the lid cover within which an expansible, self-curing foam may be injected. The lid cover and lid insert may be connected together by welding or gluing.

The one-piece lid inserts of this invention are each preferably made of a thin metal such as aluminum which is stamped or otherwise formed with the structure described above. No separate stiffener bars or the like are added or needed in the lid inserts of this invention to provide the lid with the necessary stiffness to resist bending, crimping, torqueing and misalignment when it is opened and closed, thus reducing cost and weight. The one-piece lid inserts also substantially eliminate the appearance of a raised area along the length of the lid, referred to as a wave or roll as discussed above, which has been a problem in prior art truck box lids employing expansible, self-curing foam. Further, the optional addition of pancakes or generally circular areas of cured foam in between the lid cover and lid insert of each embodiment of the lids herein provide added structural integrity, and help prevent noise which can be created by engagement of the lid cover and lid insert with one another if the truck carrying the box is driven on uneven ground, for example.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
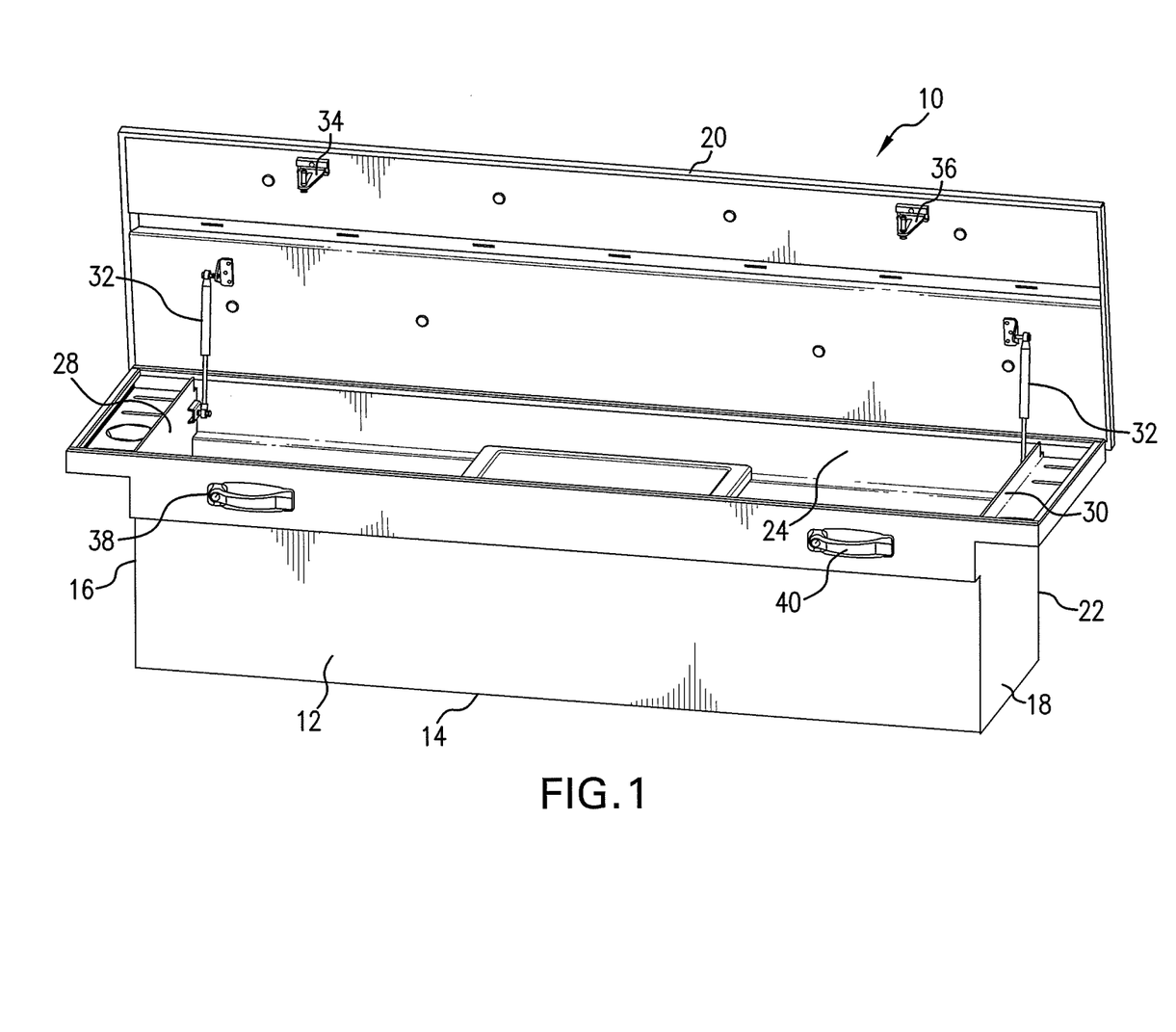
FIG. 1 is a perspective view of a truck box incorporating one embodiment of the lid of this invention which is depicted in an open position.
Figure 2:
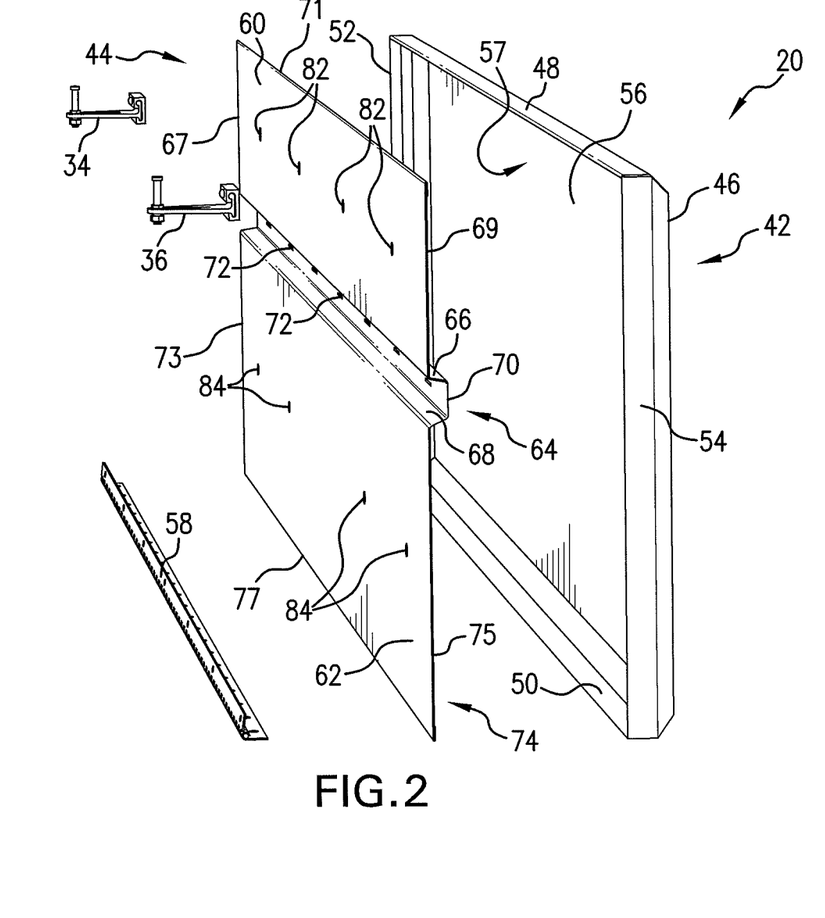
FIG. 2 is an exploded, perspective view of the lid illustrated in FIG. 1.
Figure 3:
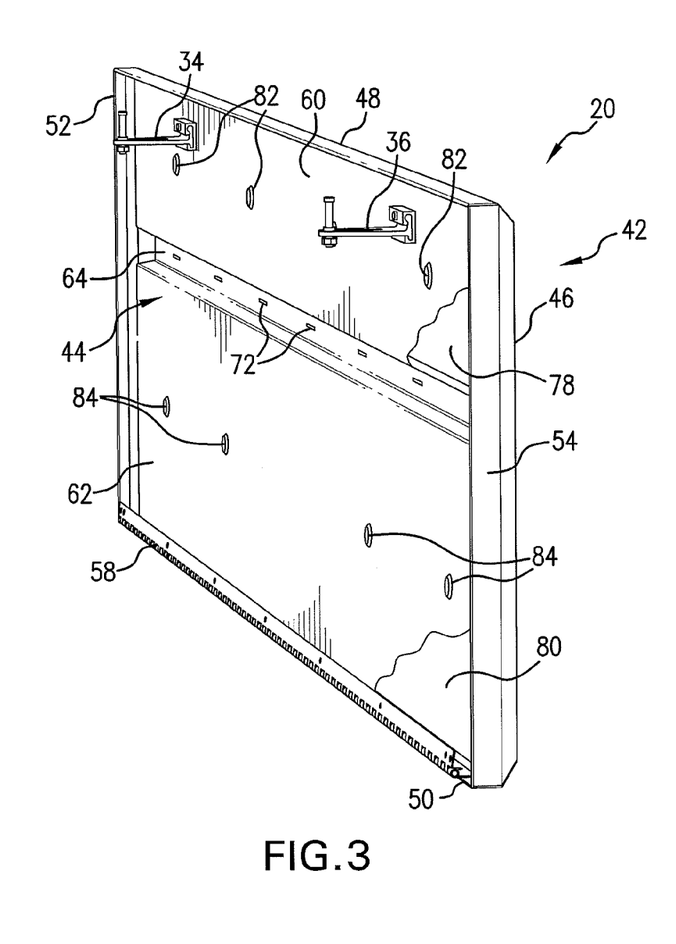
FIG. 3 is an assembled perspective view of the lid shown in FIGS. 1 and 2 hinged to the back wall of a truck box.

Referring now FIGS. 1-3, a truck box 10 is shown which comprises a front wall 12, a bottom wall 14, opposed end walls 16, 18, a reinforced lid 20 and a back wall 22. Each of the walls 12-18 and 22 is preferably formed of aluminum tread plate and they are interconnected by welding to form a hollow interior 24. For purposes of illustration and the present discussion, a single lid, cross-over box is depicted in the Figs. but it is contemplated that other types of truck boxes may be employed with the lid of this invention, discussed below, including side-mount boxes, chest boxes, top mount boxes, trailer boxes, RV boxes and others.

The interior 24 of the truck box 10 may include a pair of plates 28, 30 located near respective end walls 16, 18. Each of the plates 28, 30 supports one end of a gas spring 32 which is mounted at its opposite end to the lid 20. The lid 20 also mounts a pair of spaced striker bars 34, 36, each of which are received a latch 38, 40, respectively.

Referring to FIGS. 2 and 3, details of one embodiment of the reinforced lid 20 of this invention are illustrated. The reinforced lid 20 comprises a lid cover 42 and a one-piece lid insert 44. The lid cover 42 is preferably formed of aluminum tread plate with a top member 46 and four members which project outwardly from and generally perpendicular to the top member 46. These four members of lid cover 42 include a front member 48, a rear member 50 and opposed side members 52, 54. Each of the members 48-54 have substantially the same height dimension, as measured in a direction from the inner surface 56 of the top member 46 outwardly, and collectively form an open interior 57. A hinge 58 is attached to the rear member 50 of the lid cover 42 and to the back wall 22 of the truck box 10 so that the lid 20 is moveable between an open position and a closed position relative to the interior 24 of the truck box 10.

The one-piece lid insert 44 is preferably a sheet of aluminum tread plate or other metal material which undergoes a stamping or other bending operation to form a first panel 60, a second panel 62 and a longitudinally extending generally C-shaped channel 64 joining the first and second panels 60, 62. The channel 64 projects outwardly from the first and second panels 60, 62, and is defined by opposed side walls 66 and 68 connected by a base plate 70. Each of the side walls 66, 68 of the channel 64 has a height dimension, measured from the first and second sections 60, 62 outwardly, which is approximately equal to the height dimensions of the members 48-54 of the lid cover 42. Preferably, the base plate 70 is formed with a number of spaced weld slots 72.

The first panel 60 of the one-piece lid insert 44 has opposed side edges 67, 69 and a top edge 71. The second panel 62 has opposed side edges 73, 75 and a bottom edge 77. The edges 67-77 of panels 60, 62 collectively define a peripheral edge 74 of the one-piece lid insert 44. The lid cover 42 is dimensioned to receive the one-piece lid insert 44 within its open interior 57 such that the peripheral edge 74 of the one-piece lid insert 44 engages the inside surface of each of the members 48-54 of lid cover 42 and the base plate 70 of the channel 64 contacts the inner surface 56 of the top member 46. Since the height dimension of the members 48-54 and that of the channel 64 are approximately the same, the first and second panels 60, 62 of the lid insert 44 are substantially flush with the outer edges of members 48-54 of the lid cover 42 when the one-piece lid insert 44 is received by the lid cover 42. In this position, the one-piece lid insert 44 is preferably tack welded at its peripheral edge 74 to the members 48-54 of the lid cover 42, and the base plate 70 of the channel 64 is tack welded at its weld slots 72 to the inner surface 56 of the lid cover top member 46, or connected by adhesive thereto. Once assembled, the open interior 57 defined by the members 48-54 and top member 46 of lid cover 42 is divided into two closed cavities, e.g. a first cavity 78 located between the side wall 66 of channel 64, the front member 48 and part of the side members 52, 54 of lid cover 42, and, a second cavity 80 located between the side wall 68 of channel 64, the rear member 50 and another part of the side members 52, 54 of lid cover 42.

The welded or adhesive connection between the lid cover 42 and the channel 64 of the one-piece lid insert 44 described above provides substantial structural rigidity and resistance to bending, crimping, torqueing and misalignment when the lid 20 is opened and closed. Further, since the channel 64 of the lid 20 extends along the entire longitudinal extent of the lid 20, approximately at its center, the appearance of a wave or roll along the lid 20 when it is closed is substantially eliminated. This is achieved in the lid 20 of this invention without the addition of any braces or other members attached thereto, thus reducing cost and weight.

In one presently preferred embodiment, each of the first and second panels 60, 62 of the one-piece lid insert 44 may be formed with spaced ports 82 and 84, respectively. The ports 82 formed in the first panel 60 extend into the first cavity 78 between the lid cover 42 and one-piece lid insert 44, and the ports 84 formed in the second panel 62 extend into the second cavity 80 between the lid cover 42 and one-piece lid insert 44. A "shot" or discrete quantity of expansible, self-curing foam may be injected through one or more of the ports 82, 84 into each of the cavities 78, 80. Each shot of foam, when cured, forms a pancake or generally circular area of foam which adheres to both the top member 46 of the lid cover 42 and the first and second panels 60, 62 of the one-piece lid insert 44. Preferably, the foam pancakes do not contact the members 48-54 of the lid cover 42, or one another. As noted above, the foam pancakes provide added structural integrity to the lid, and also prevent noise which can be created by engagement of the lid cover 42 and one-piece lid insert 44 if the truck box 10 is subjected to vertical movement such as when a truck is driven on uneven ground.

Figure 4:
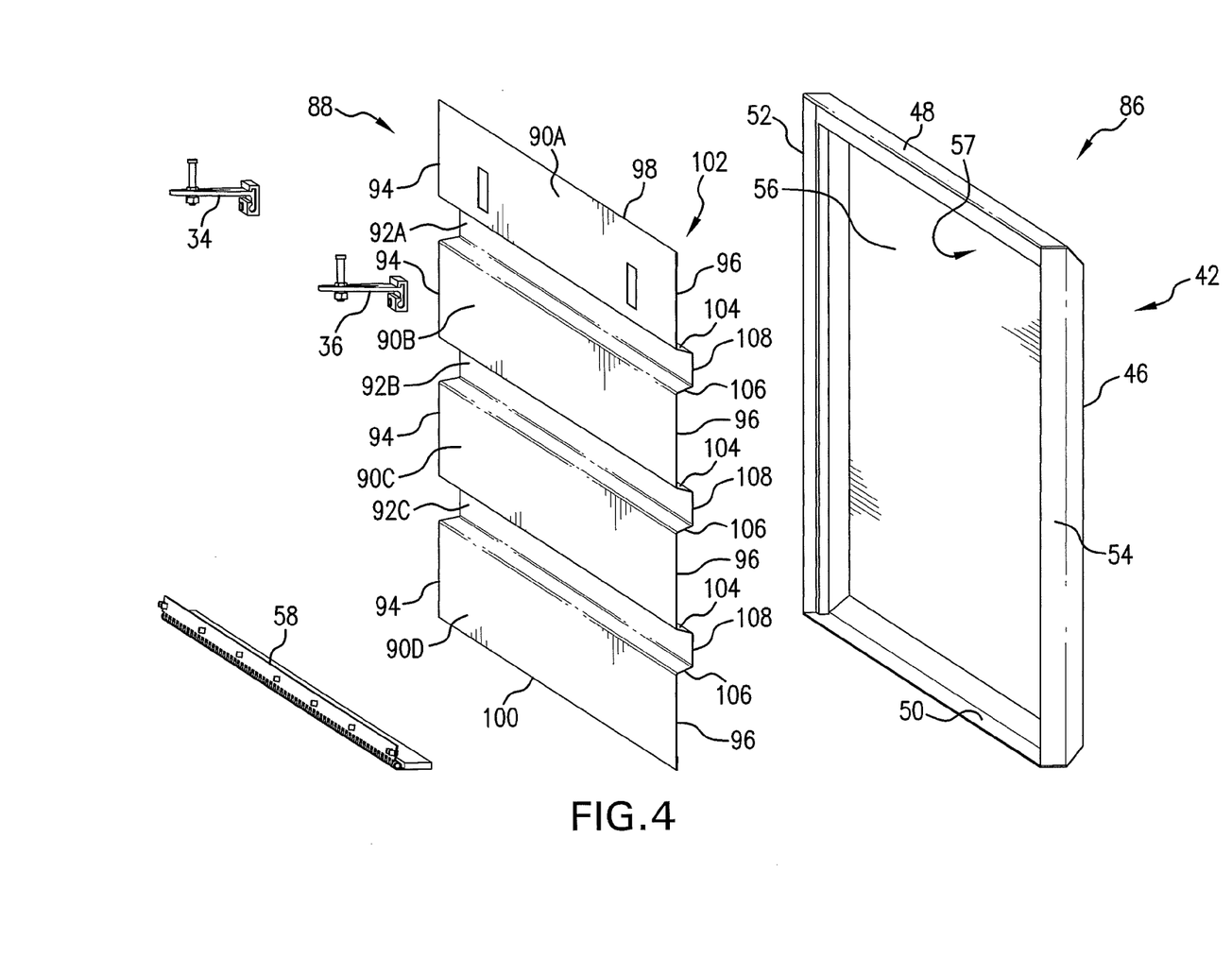
FIG. 4 is an exploded perspective view of an alternative embodiment of the lid insert.
Figure 5:
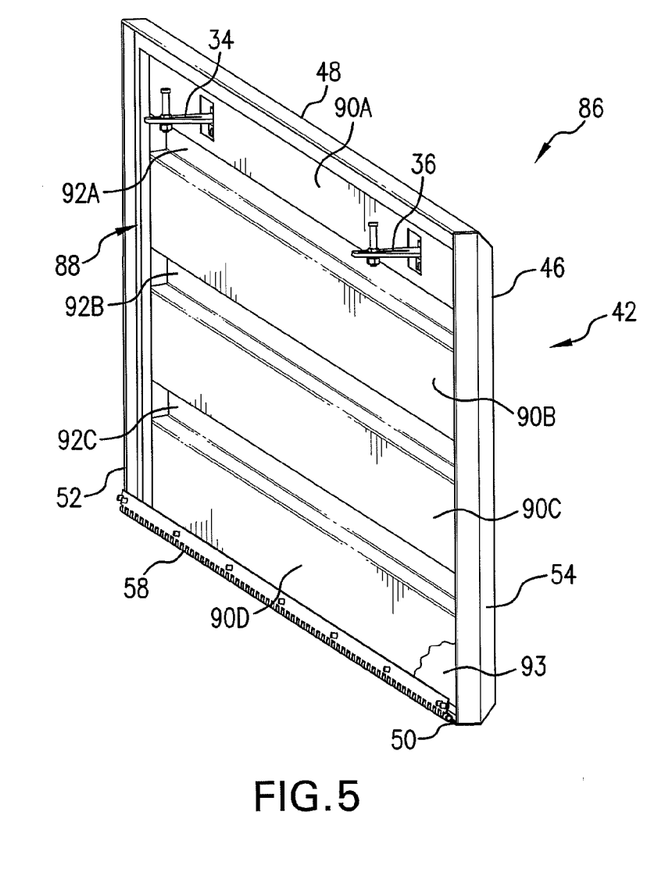
FIG. 5 is an assembled perspective view of the lid shown in FIG. 4.

Referring now to FIGS. 4 and 5, and alternative embodiment of a lid 86 of this invention is illustrated which comprises the same lid cover 42 described above in connection with a discussion of FIGS. 1-3 and a one-piece lid insert 88. The same reference numbers depicting the structure of lid cover 42 in FIGS. 1-3 are included in FIGS. 4 and 5.

The lid insert 88 comprises a number of spaced panels 90A-D connected by channels 92A-C. In particular, channel 92A connects panels 90A and 90B, channel 92B connects panels 90B and 90C, and, channel 92C connects panels 90C and 90D. Each of the panels 90A-D has opposed side edges 94 and 96. The outermost channel 90A has a front edge 98 and the opposite, outermost channel 90D has a rear edge 100. Collectively, the side edges 94, 96, front edge 98 and rear edge 100 define a peripheral edge 102 of the lid insert 88. Each of the channels 92A-C has opposed side walls 104 and 106 connected by a base plate 108. The side walls 104, 106 each has a height dimension, measured from the surface of the panels 90A-D, which is approximately equal to the height dimension of members 48-54 of the lid cover 42.

The lid cover 42 is dimensioned to receive the lid insert 88 such that the peripheral edge 102 of the lid insert 88 engages the inside surface of members 48-54 and the base plate 108 of each channel 92A-C contacts the inner surface 56 of the top member 46 of lid cover 42. Since the height dimension of the members 48-54 and that of the channels 92A-C are approximately the same, the panels 90A-D of the lid insert 88 are substantially flush with the outer edges of the members 48-54 of the lid cover 42 when the lid insert 88 is received within the lid cover 42. The lid insert 88 is preferably tack welded at its peripheral edge 102 to the members 48-54 of the lid cover 42, and the base plate 108 of each channel 92A-C is welded or connected by adhesive to the inner surface 56 of the lid cover top member 46. Once assembled, the open interior 57 defined by the members 48-54 and top member 46 of lid cover 42 is divided into closed cavities 93, e.g. between the panels 90A-D of the lid insert 88 and the top and side members 46-54 of the lid cover 42. One of the cavities 93 is shown in FIG. 5. A shot of expansible, self-curing foam may be injected into each cavity in the same manner as described above in connection with a discussion of FIGS. 1-3.

Figure 6:
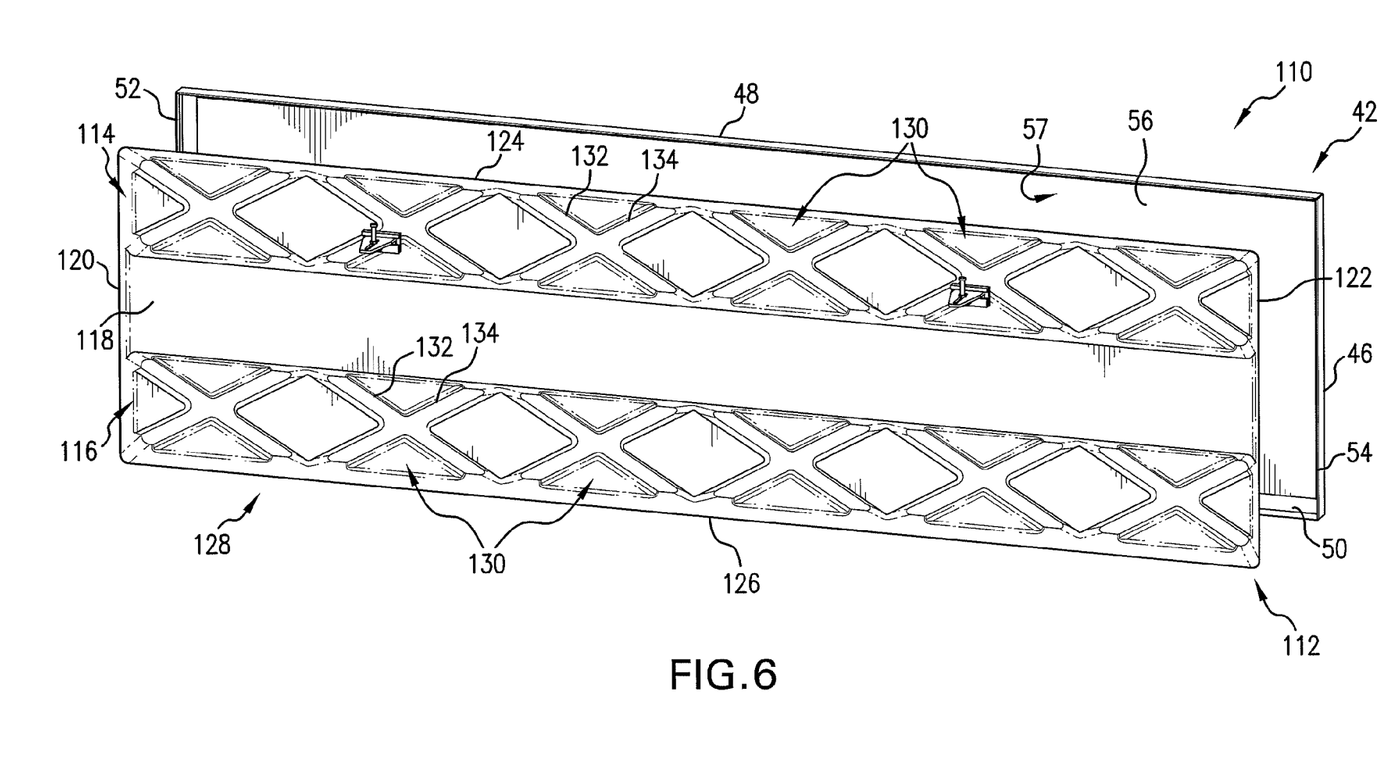
FIG. 6 is an exploded perspective view of still another embodiment of the lid insert of this invention.
Figure 7:
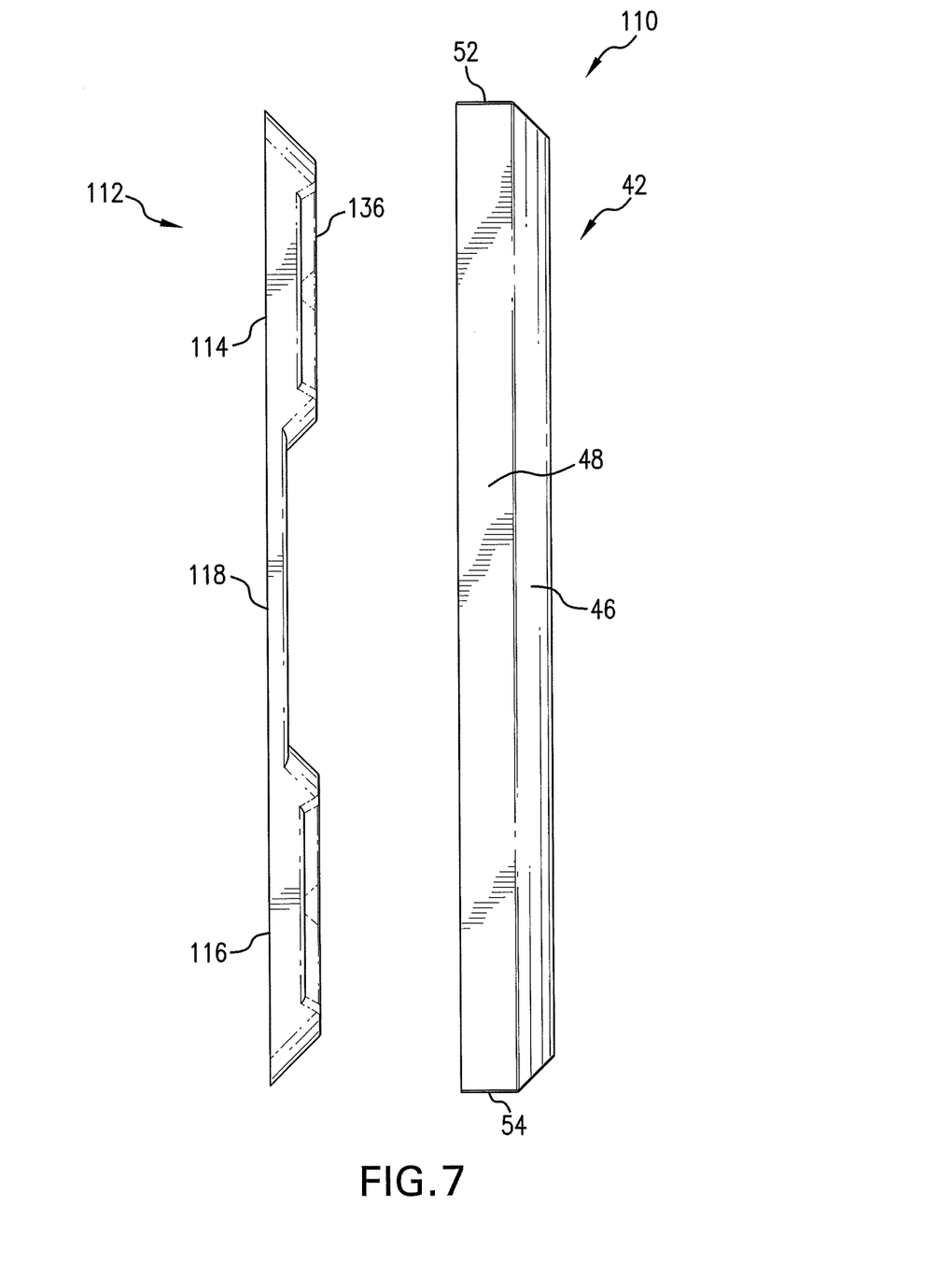
FIG. 7 is a side elevation view of the lid insert illustrated in FIG. 6.

With reference to FIGS. 6 and 7, a still further embodiment of a lid 110 according to this invention is shown. The lid 110 comprises the same lid cover 42 described above in connection with a discussion of FIGS. 1-3 and a one-piece lid insert 112. The same reference numbers depicting the structure of lid cover 42 in FIGS. 1-3 are included in FIGS. 6 and 7.

The lid insert 112 comprises a first panel 114, a second panel 116 and a recessed area 118 connected between the panels 114, 116. Each of the first and second panels 114, 116 has opposed side edges 120 and 122. The first panel 114 has a front edge 124 and the second panel 116 has a rear edge 126. The edges 114-126 collectively form a peripheral edge 128 of the lid insert 112. The first panel 114 is formed with a number of side-by-side cross braces 130 extending outwardly therefrom, in a direction away from the recessed area 118, and along the length of the first panel 114 in between its side edges 120, 122. Each cross brace 130 is configured in the shape of an "X" having two legs 132 and 134, and they are arranged so that the tips of adjacent cross braces 130 contact one another. The legs 132, 134 of each cross brace 130 collectively form an inner surface 136, and they have a height dimension which is substantially the same as the height dimension of the members 48-54 of the lid cover 42.

The lid cover 42 is dimensioned to receive the lid insert 112 such that the peripheral edge 128 of the lid insert 112 engages the inside surface of members 48-54 and the inner surface 136 of each cross brace 130 contacts the inner surface 56 of the top member 46 of lid cover 42. Since the height dimension of the members 48-54 and that of the cross braces 130 are approximately the same, the first and second panels 114, 116 of the lid insert 112 are substantially flush with the outer edges of the members 48-54 of the lid cover 42 when the lid insert 112 is received within the lid cover 42. The lid insert 112 is preferably tack welded at its peripheral edge 128 to the members 48-54 of the lid cover 42, and the inner surface 136 of the cross braces 130 is welded or connected by adhesive to the inner surface 56 of the lid cover top member 46. Once assembled, the open interior 57 defined by the members 48-54 and top member 46 of lid cover 42 is divided into a cavity (not shown), e.g. between the recessed area 118 of the lid insert 112 and the top and side members 46-54 of the lid cover 42. A shot of expansible, self-curing foam may be injected into such cavity in the same manner as described above in connection with a discussion of FIGS. 1-3.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A truck bed toolbox, comprising:
    a front wall, a back wall, a bottom wall and opposed end walls interconnected to form a hollow interior;
    a lid connected to said back wall and movable between an open position and a closed position relative to said hollow interior, said lid including:
    (i) a lid cover having a front member, a rear member and opposed side members each connected to a top member to form an open interior;
    (ii) a one-piece lid insert having a front edge, a rear edge and opposed side edges collectively defining a peripheral edge, said one-piece lid insert being formed with a channel extending continuously between said opposed side edges thereof, said channel having a base plate joined to a first side wall and to a second side wall, a first panel being connected to said first side wall and a second panel being connected to said second side wall so that a space is formed between said base plate of said channel and each of said first and second side walls, each of said first and second panels extending between said opposed side edges of said one-piece lid insert and to one of said front edge and said rear edge thereof;
    (iii) said one-piece lid insert being connected to said lid cover so that said base plate of said channel is mounted to said top member and said peripheral edge of said one-piece insert is mounted to said front member, rear member and opposed side members of said lid cover, a first cavity being formed by said first panel of said one-piece lid insert, said first wall of said channel and at least a portion of said front member, said opposed side members and said top member of said lid cover, a second cavity being foil led by said second panel of said one-piece lid insert, said second wall of said channel and at least a portion of said rear member, said opposed side members and said top member of said lid cover.

2. The truck bed toolbox of claim 1 in which each of said front member, rear member and opposed side members of said lid cover has the same first height dimension, said channel of said one-piece lid insert having a second height dimension which is substantially the same as said first height dimension.

3. The truck bed toolbox of claim 2 in which said peripheral edge of said one-piece lid insert is mounted substantially flush with said front and rear members, and said opposed side members, of said lid cover.

4. The truck bed toolbox of claim 1 in which said channel of said one-piece lid insert is welded or connected by adhesive to said top member of said lid cover.

5. The truck bed toolbox of claim 1 in which each of said first and second panels of said one-piece lid insert is formed with at least one injection port, an expansible, self-curing foam material being injected through said at least one injection port into each of said first and second cavities which adheres to each of said first and second panels of said one-piece lid insert and to said top member of said lid cover when cured.

6. A truck bed toolbox, comprising:
   a front wall, a back wall, a bottom wall and opposed end walls interconnected to form a hollow interior;
   a lid connected to said back wall and movable between an open position and a closed position relative to said hollow interior, said lid including:
   (i) a lid cover having a front member, a rear member and opposed side members each connected to a top member to form an open interior;
   (ii) a one-piece lid insert having a front edge, a rear edge and opposed side edges collectively defining a peripheral edge, said one-piece lid cover being formed with a number of spaced panels, adjacent ones of said panels being connected to each other by a channel, each of said channels including a base plate and opposed side walls each joined to said base plate and to one of said adjacent panels so that a space is formed between said base plate and each of said adjacent panels, said channels extending substantially parallel to one another and extending continuously between two edges of said one-piece lid insert;
   (iii) said one-piece lid insert being connected to said lid cover so that said base of each of said channels is mounted to said top member and said peripheral edge of said one-piece lid insert is mounted to said front member, rear member and opposed side members of said lid cover, a cavity being formed between each of said panels of said one-piece lid insert and said top member of said lid cover.

7. The truck bed toolbox of claim 6 in which said base plate of each of said channels is welded or connected by adhesive to said top member of said lid cover.

8. The truck bed toolbox of claim 6 in which each of said panels of said one-piece lid insert is formed with at least one injection port, an expansible, self-curing foam material being injected into each of said cavities which adheres to said top member and to said panels when cured.

\* \* \* \* \*